(12) United States Patent
Satish

(10) Patent No.: US 9,231,969 B1
(45) Date of Patent: Jan. 5, 2016

(54) DETERMINING FILE RISK BASED ON SECURITY REPUTATION OF ASSOCIATED OBJECTS

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 486 days.

(21) Appl. No.: 12/790,610

(22) Filed: May 28, 2010

(51) Int. Cl.
*H04L 29/06* (2006.01)

(52) U.S. Cl.
CPC ......... *H04L 63/1433* (2013.01); *H04L 63/1416* (2013.01)

(58) Field of Classification Search
CPC .................... H04L 63/1433; H04L 63/1416
USPC .......................................... 726/22, 23, 25, 26
See application file for complete search history.

(56) References Cited

U.S. PATENT DOCUMENTS

| | | | |
|---|---|---|---|
| 5,826,013 A * | 10/1998 | Nachenberg | 726/22 |
| 7,472,420 B1 * | 12/2008 | Pavlyushchik | 726/24 |
| 2003/0061502 A1 * | 3/2003 | Teblyashkin et al. | 713/200 |
| 2008/0066179 A1 * | 3/2008 | Liu | 726/24 |
| 2010/0212010 A1 * | 8/2010 | Stringer et al. | 726/22 |

* cited by examiner

*Primary Examiner* — Ellen Tran

(74) *Attorney, Agent, or Firm* — Brill Law Office; Jeffrey Brill

(57) ABSTRACT

The creations of objects by files that have not been previously identified as malware are tracked. The security reputations of specific created objects are determined. Based on the determined security reputations of specific created objects, the security risks concerning the specific files that created the objects are determined. Responsive to whether a determined security risk concerning a specific creating file meets a given threshold, it is determined whether the specific creating file comprises malware. Responsive to determining that a specific creating file comprises malware, the creating file is blocked from performing the activity associated with the creation of the associated object. Responsive to determining that a creating file comprises malware, the creating file can be disabled, and an alert concerning the creating file can be transmitted to a central security server.

20 Claims, 4 Drawing Sheets

DETERMINING FILE RISK BASED ON SECURITY REPUTATION OF ASSOCIATED OBJECTS

TECHNICAL FIELD

This disclosure pertains generally to computer security, and more specifically to determining the risk of a given file based on the security reputation of associated objects.

BACKGROUND

Malware is often engineered to remain on a computer it has infected even after the computer is rebooted. To do so, the malware registers itself with the operating system, such that it is automatically loaded when the operating system restarts. In an effort to evade detection by anti-malware products, malware is often polymorphic in nature. Polymorphic malware changes the file in which it resides (known as the backing file) with every infection (or at other frequencies), so as to avoid detection by signature based scanning. As the backing file changes between infections, so too does its fingerprint (hash). Thus, scanning files for signatures of known malware can fail to identify a changed backing file. Different tools of varying effectiveness do exist for detecting polymorphic malware, but it would be desirable to further address these issues, practically in the context of polymorphic malware that registers itself with the operating system to remain on an infected computer after reboot.

SUMMARY

Security risks of files are determined based on the security reputations of created objects. The creations of objects by files that have not been previously identified as malware are tracked. The security reputations of specific created objects are determined, for example by retrieving the security reputations from an object reputation database. Based on the determined security reputations of specific created objects, the security risks concerning the specific files that created the objects are determined. Responsive to whether a determined security risk concerning a specific creating file meets a given threshold, it is determined whether the specific creating file comprises malware.

Responsive to determining that a specific creating file comprises malware, the creating file is blocked from performing the activity associated with the creation of the associated object. This blocking can comprise, for example, blocking an attempt by the creating file to register itself with an operating system in order to be automatically started when the operating system is booted. Responsive to determining that a specific creating file comprises malware, the specific creating file can be disabled, and an alert concerning the specific creating file can be transmitted to a central security server.

To stock the object reputation database, security reputations concerning a plurality of created objects can be calculated and stored, each security reputation concerning a specific created object being based at least partially on security reputations of associated creating files. These stored security reputations can be adjusted over time, based on associated creating file activity concerning the specific created objects.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
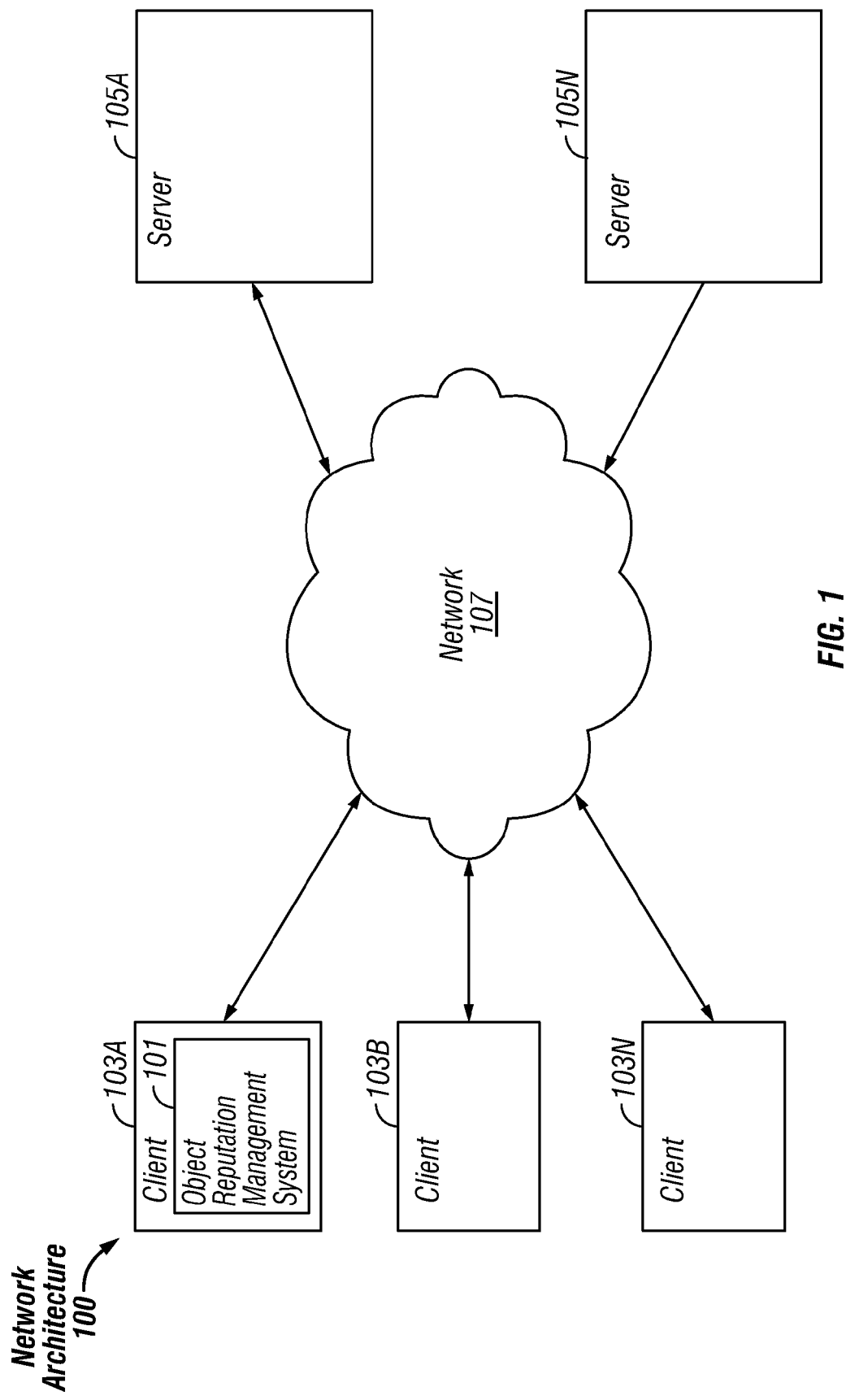
FIG. 1 is a block diagram of an exemplary network architecture in which an object reputation management system can be implemented, according to some embodiments.

FIG. 1 is a block diagram illustrating an exemplary network architecture 100 in which an object reputation management system 101 can be implemented. The illustrated network architecture 100 comprises multiple clients 103A, 103B and 103N, as well as multiple servers 105A and 105N. In FIG. 1, the object reputation management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
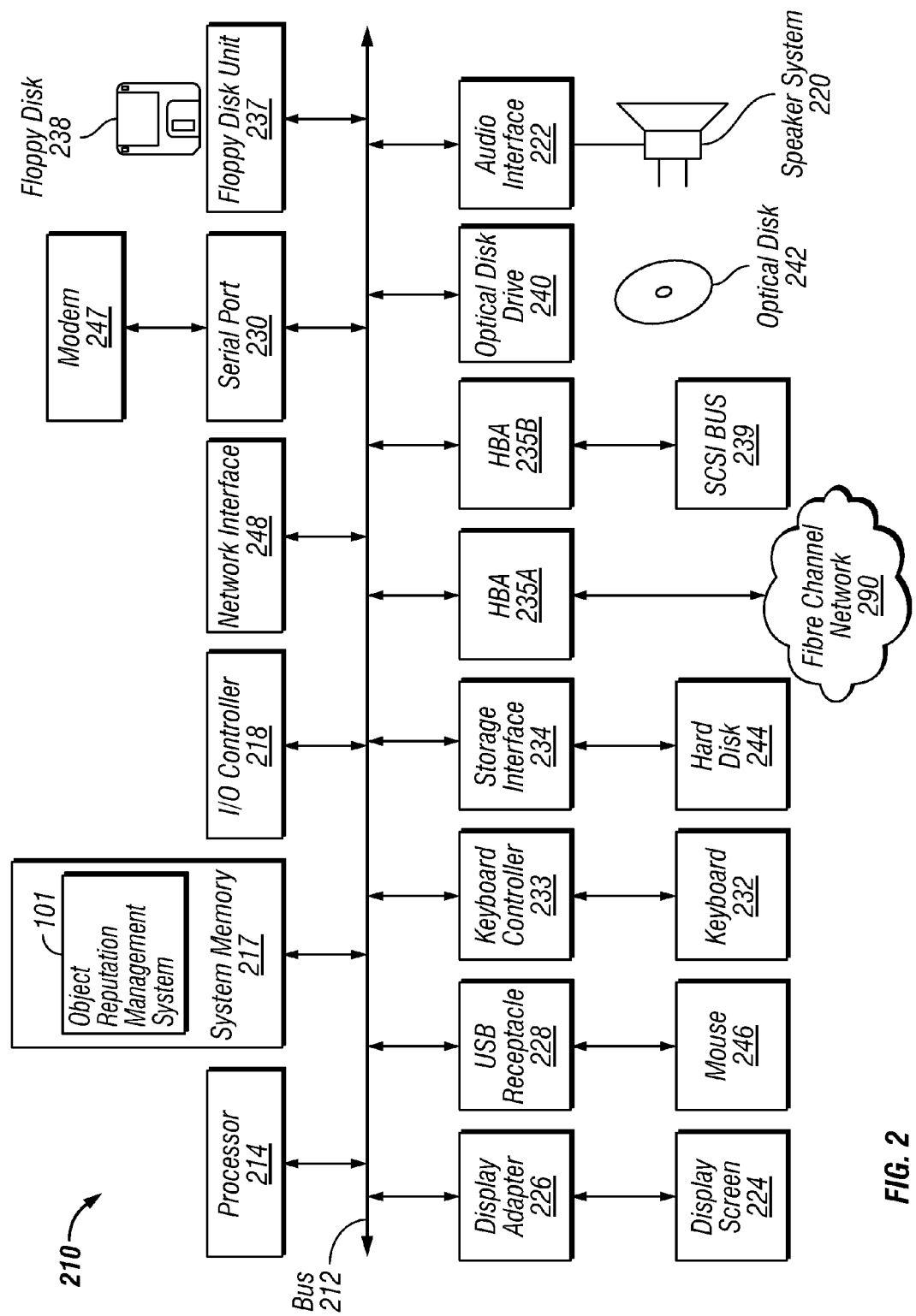
FIG. 2 is a block diagram of a computer system suitable for implementing an object reputation management system, according to some embodiments.

FIG. 2 is a block diagram of a computer system 210 suitable for implementing an object reputation management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the object reputation management system 101 is illustrated as residing in system memory 217. The workings of the object reputation management system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
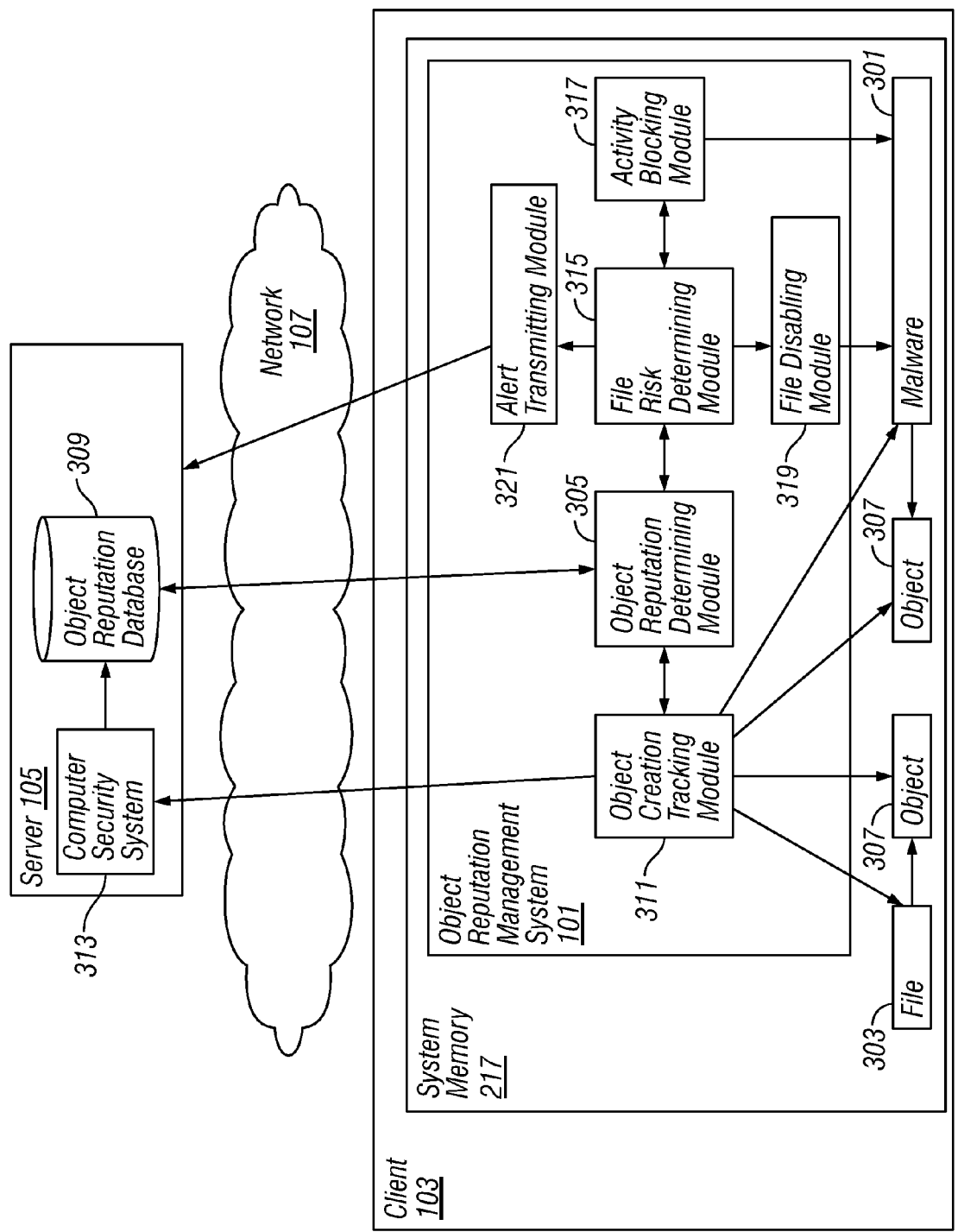
FIG. 3 is a block diagram of the operation of an object reputation management system, according to some embodiments.

FIG. 3 illustrates the operation of an object reputation management system 101 residing in the system memory 217 of a client computer 103, according to some embodiments. As described above, the functionalities of the object reputation management system 101 can reside on a client 103, a server 105, or be distributed between multiple computer systems 210, including within a cloud-based computing environment in which the functionality of the object reputation management system 101 is provided as a service over a network 107. It is to be understood that although the object reputation management system 101 is illustrated in FIG. 3 as a single entity, the illustrated object reputation management system 101 represents a collection of functionalities, which can be instantiated as a single or multiple modules as desired (an instantiation of specific, multiple modules of the object reputation management system 101 is illustrated in FIG. 3). It is to be understood that the modules of the object reputation management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the object reputation management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the object reputation management system 101 leverages the fact that even as polymorphic malware 301 changes its backing file 303, certain behaviors of the polymorphic malware 301 do not change. More specifically, as polymorphic malware 301 registers itself with the operating system and executes other functions, it creates various objects 307 which tend to be more static than the backing file 303 of the polymorphic malware 301 itself. In other words, different mutations of the polymorphic malware 301 are instantiated in varying backing files 303 to evade signature based detection, yet tend to perform the same functions and create the same objects 307. For example, different variants of given polymorphic malware 301 often create registration objects 307 and/or runtime objects 307 with the same names and/or properties. One such example is malware 301 that creates an object 307 in the form of a service for itself or its components, to automatically start on reboot of the operating system. The name of the service may remain the same across many variants of the malware 301, even though the backing file 303 may change in both name and contents.

Objects 307 are not limited to those created in association with registration, but also comprise other types of runtime objects 307 created as programs execute. It is to be understood that as used herein, the term "object 307" means any named component created by a running program (file 303) during the course of its operation. Examples of various such registration objects 307 and runtime objects 307 include (but are not limited to): a service, a Run/RunOnce key value, a scheduled task/job, an Explorer/shell extension or browser helper object ("BHO"), a program group, a synchronization object, a component object model ("COM") globally unique identifier ("GUID"), a layered service provider ("LSP"), a printer spooler service, a run time instance window (title bar), a named pipe and a mutual exclusion ("mutex"). As explained in more detail below, the object reputation management system 101 utilizes the consistency in objects 307 to protect against polymorphic malware 301.

As illustrated in FIG. 3, an object reputation database 309 (or other suitable storage mechanism) can be maintained, storing security reputations concerning various objects 307, based on the security reputation of the files 303 that created them. In other words, the creation of objects 307 by files 303 classified as being legitimate or malicious (based on, for example, assessment by conventional anti-malware systems) can be tracked, as described in more detail below. Where a given object 307 is created by a malicious file 303, the associated security reputation of the object 307 can be lowered, and where an object 307 is created by a legitimate file 303, its associated security reputation can be raised. Thus, the security reputation of a given object 307 is computed on the basis of security reputation of the creating file(s) 303. Note that the security reputation of a given object 307 can be adjusted up and/or down over time, based on the file(s) 303 that create that object 307. In addition to the security reputations of individual creating files 303, typically the larger the number of creating files 303 associated with a given object 307, the worse its security reputation (i.e., the higher its classified security risk). In other words, where multiple files 303 are tracked as creating instances of the same object 307 over time, that object 307 is typically classified as being a greater security risk than if an object created by fewer or only a single file 303. The number of creating files 303 associated with an object can be tracked not only by name, but additionally in other ways such as hash, checksum and/or path. It is to be understood that the object reputation database 309 can be maintained by a centralized computer security system 313 located on a server 105 as illustrated. In other embodiments, the object reputation database 309 can be maintained locally on a client 103 computer by the object reputation management system 101, or distributed between multiple locations. It is to be understood that the specific assignment, adjustment and computation of object security reputations based on relationships to creating files 303 is a variable design parameter.

Typically, where the object reputation database 309 is maintained by a centralized computer security system 313, the centralized computer security system 313 receives corresponding information concerning created objects 307 from a plurality of clients 103 over time. For example, as illustrated in FIG. 3, an object creation tracking module 311 of the object reputation management system 101 tracks the creation of objects 307 on the client 103, and transmits information concerning the security reputation of the creating files 303 to the centralized computer security system 313. The object creation tracking module 311 can use various conventional techniques to track the creation of objects 307, such as filtering specific services and/or intercepting relevant system calls. Typically, the centralized computer security system 313 would receive such information from a plurality of object reputation management systems 101 running on a plurality of clients 103. (Only one such client 103 is illustrated in FIG. 3 for visual clarity.) As noted above, information concerning the security reputation of creating files 303 can be determined by, for example, a conventional anti-malware system (not illustrated). In some embodiments, a centrally located object reputation database 309 is simply made available to a client-side object reputation management systems 101, without the object reputation management systems 101 contributing to its maintenance.

In any case, the security reputation of objects 307 created by files 303 that have not been identified as comprising malware 301 (e.g., new files 303 or files 303 that have not been definitively identified as being malicious or legitimate) are used to identify potential polymorphic malware 301, and protect against the potential associated security risks. The object creation tracking module 311 tracks the creation of objects 307 by such files 303. Where the creation of an object 307 by such a file 303 is tracked, an object reputation determining module 305 of the object reputation management system 101 determines the security reputation of the object 307, for example by retrieving it from the object reputation database 309. A file risk determining module 315 of the object reputation management system 101 uses the security reputation of the created object 307 to determine the security risk of the creating file 303. Where the security reputation of a created object 307 meets a given threshold, the file risk determining module 315 determines that the creating file 303 comprises malware 301. In other words, certain objects 307 are known to be created by files 303 with high security risks or otherwise to have low security reputations. Where an object with a sufficiently low security reputation is created by a file 303 of an undetermined status, the file 303 is considered to be malware 301 because it created that object 307. In some embodiments, a file 303 is not classified as malware 301 unless it creates a plurality of objects 307 with low security reputations and/or creates such an object 307 multiple times. The specific threshold and/or other factors according to which a creating file 303 is classified as malware 301 is a variable design parameter.

Where the file risk determining module 315 determines that a specific creating file 303 is legitimate, the activity associated with the created object 397 is allowed to proceed. On the other hand, where the file risk determining module 315 determines that a specific creating file 303 comprises malware 301, an activity blocking module 317 of the object reputation management system 101 can block the attempted activity associated with the created object 307, thereby protecting the client computer 103 from the attempted malicious activity. This activity blocking can comprise denying an attempt of the malicious creating file 303 to register itself with the operating system, where the object 307 in question comprises a registration object 307. Where the object 307 in question comprises a runtime object 307, the activity blocking module 317 blocks whatever malicious runtime activity was being attempted by the creation of the object 307, causing the attempted malicious activity to fail. The activity blocking module 317 can use various conventional techniques to block specific activities, such as filtering specific services and/or intercepting relevant system calls. Additionally, where a given creating file 303 is determined to be malware 301, a file disabling module 319 of the object reputation management system 101 can use conventional techniques to close, isolate, disinfect, delete and/or otherwise disable the file 303. An alert transmitting module 321 of the object reputation management system 101 can also transmit an alert or other relevant information concerning the file 303 to a central security server 105.

Figure 4:
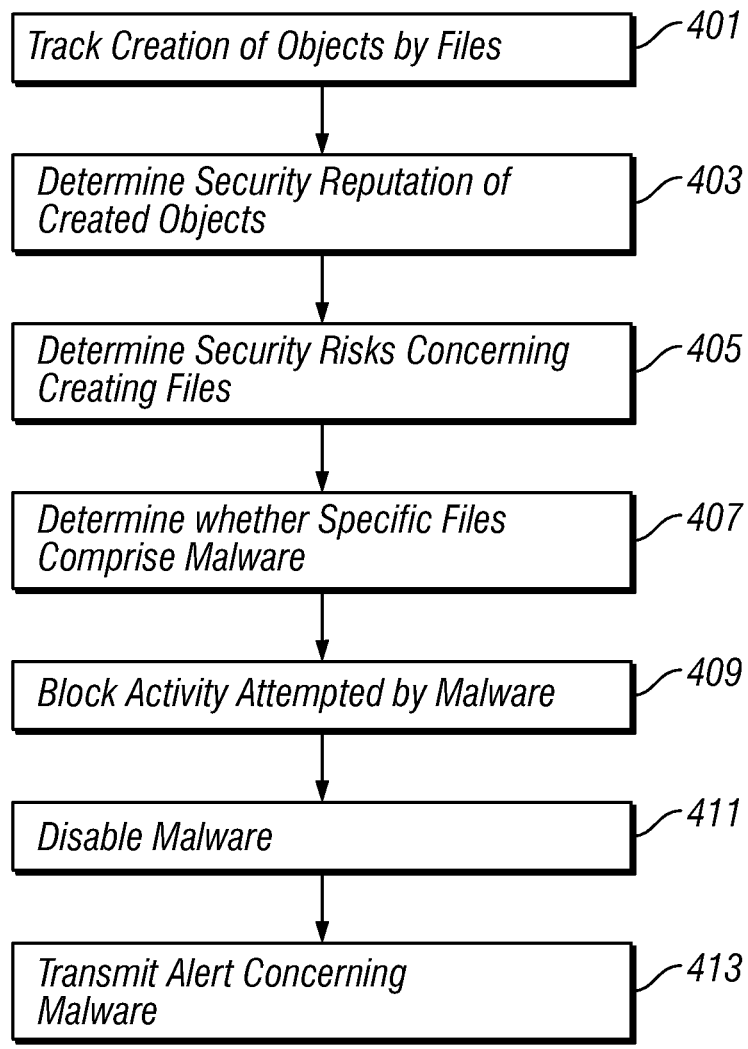
FIG. 4 is a flowchart of the operation of an object reputation management system, according to some embodiments.

FIG. 4 illustrates steps of the operation of an object reputation management system 101 (FIG. 1), according to some embodiments. An object creation tracking module 311 (FIG. 3) of the object reputation management system 101 (FIG. 1) tracks 401 the creations of objects 307 (FIG. 3) by files 303 (FIG. 3) that have not been previously identified as malware 301 (FIG. 3). An object reputation determining module 305 (FIG. 3) of the object reputation management system 101 (FIG. 1) determines 403 the security reputations of specific created objects 307 (FIG. 3). Based on the determined security reputations of specific created objects 307 (FIG. 3), a file risk determining module 315 (FIG. 3) of the object reputation management system 101 (FIG. 1) determines 405 security risks concerning the specific files 303 (FIG. 3) that created the objects (FIG. 3). Responsive to whether a determined security risk concerning a specific creating file 303 (FIG. 3) meets a given threshold, the file risk determining module 315 (FIG. 3) determines 407 whether the specific creating file 303 (FIG. 3) comprises malware 301 (FIG. 3). An activity blocking module 317 (FIG. 3) of the object reputation management system 101 (FIG. 1) blocks 409 the attempted activity associated with an associated created object 307 (FIG. 3), responsive to determining that a specific creating file 303 (FIG. 3) comprises malware 301 (FIG. 3). Additionally, responsive to determining that a specific creating file 303 (FIG. 3) comprises malware 301 (FIG. 3), a file disabling module 319 (FIG. 3) of the object reputation management system 101 (FIG. 1) can disable 411 the specific creating file 303 (FIG. 3), and an alert transmitting module 321 (FIG. 3) of the object reputation management system 101 (FIG. 1) can transmit 413 an alert to a central security server 105 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for tracking security risks of a polymorphic file by tracking static objects generated by the polymorphic file, the method comprising the steps of:
    tracking, by a computer, a first object created by a first mutation of a polymorphic file at a first time wherein the polymorphic file has not been previously identified as comprising malware and said first object is tracked for performing a malware service;
    determining whether a security reputation for the first object meets a security threshold;
    determining, by a computer, a security risk of the polymorphic file that created the first object based on the security reputation of the first object, wherein, responsive to a determination that the security reputation for the first object meets the predetermined security threshold, the polymorphic file is determined to comprise malware if it meets a security threshold determined based on at least one of: the number of distinct first objects created by the polymorphic file and the number of times a distinct first object is created by the polymorphic file;
    storing, by a computer, the security reputation for the first object in a database;
    linking, by a computer, a second mutation of the polymorphic file to the first mutation by subsequently identifying the first object created by a second mutation of the polymorphic file at a second time; and
    receiving, by a computer, the security risk of the polymorphic file that created the first object at the first and second times based on the determined security reputation of the first object.

2. The method of claim 1 wherein determining, by a computer, whether a security reputation for the first object meets a security threshold, further comprises:
    retrieving, by a computer, the security reputation for the first object from an object reputation database.

3. The method of claim 1 further comprising:
    responsive to determining that a polymorphic file comprises malware, blocking, by a computer, an attempt by the polymorphic file to perform an activity associated with an associated object.

4. The method of claim 3 wherein blocking, by a computer, an attempt by a polymorphic file to perform an activity associated with an associated created object further comprises:
    responsive to determining that the polymorphic file comprises malware, blocking, by a computer, an attempt by the polymorphic file to register itself with an operating system in order to be automatically started when the operating system is booted.

5. The method of claim 1 further comprising:
    responsive to determining that a polymorphic file comprises malware, disabling, by a computer, the polymorphic file.

6. The method of claim 1 further comprising:
    responsive to determining that a polymorphic file comprises malware, transmitting, by a computer, an alert concerning the polymorphic files to a central security server.

7. The method of claim 1 further comprising:
    storing, by a computer, security reputations concerning a plurality of created objects, each security reputation concerning for a first object being based at least partially on at least one security reputation of at least one associated polymorphic file.

8. The method of claim 7 further comprising:
    adjusting, by a computer, a stored security reputation for a first object, based on associated polymorphic file activity concerning the first object.

9. The method of claim 7 wherein determining, by a computer, whether a security reputation for the first object meets a security threshold further comprises:
    retrieving, by a computer, a stored security reputation of the first object.

10. At least one non-transitory computer readable storage medium storing a computer program product for tracking security risks of a polymorphic file by tracking static objects generated by the polymorphic file, the computer program product comprising:
    program code for tracking a first object created by a first mutation of a polymorphic file at a first time wherein the polymorphic file has not been previously identified as comprising malware and said first object is tracked for performing a malware service;
    program code for determining whether a security reputation for the first object meets a security threshold;
    program code for determining a security risk of the polymorphic file that created the first object based on the security reputation of the first object, wherein, responsive to a determination that the security reputation for the first object meets the predetermined security threshold, the polymorphic file is determined to comprise malware if it meets a security threshold determined based on at least one of: the number of distinct first objects created by the polymorphic file and the number of times a distinct first object is created by the polymorphic file;
    program code for storing the security reputation for the first object in a database;
    program code for linking a second mutation of the polymorphic file to the first mutation by subsequently identifying the first object created by a second mutation of the polymorphic file at a second time; and
    program code for receiving the security risk of the polymorphic file that created the first object at the first and second times based on the determined security reputation of the first object.

11. The computer program product of claim 10 wherein the program code for determining whether a security reputation for the first object meets a security threshold further comprises:
    program code for retrieving the security reputation for the first object from an object reputation database.

12. The computer program product of claim 10, further comprising:

program code for, responsive to determining that a polymorphic file comprises malware, blocking an attempt by the polymorphic file to perform an activity associated with an associated object.

13. The computer program product of claim 12 wherein the program code for blocking an attempt by a polymorphic file to perform an activity associated with an associated created object further comprises:
   program code for, responsive to determining that the polymorphic file comprises malware, blocking an attempt by the polymorphic file to register itself with an operating system in order to be automatically started when the operating system is booted.

14. The computer program product of claim 10 further comprising:
   program code for, responsive to determining that a polymorphic file comprises malware, disabling the polymorphic file.

15. The computer program product of claim 10 further comprising:
   program code for, responsive to determining that a polymorphic file comprises malware, transmitting an alert concerning the polymorphic files to a central security server.

16. The computer program product of claim 10 further comprising:
   program code for storing security reputations concerning a plurality of created objects, each security reputation concerning a first object being based at least partially on at least one security reputation of at least one associated polymorphic file.

17. The computer program product of claim 16 further comprising:
   program code for adjusting a stored security reputation for a first object, based on associated polymorphic file activity concerning the first object.

18. The computer program product of claim 16 wherein the program code for determining whether a security reputation for the first object meets a security threshold further comprises:
   program code for retrieving a stored security reputation for the first object.

19. A computer system for tracking security risks of a polymorphic file by tracking static objects generated by the polymorphic file, the computer system comprising:
   means for tracking a first object created by a first mutation of a polymorphic file at a first time wherein the polymorphic file has not been previously identified as comprising malware and said first object is tracked for performing a malware service;
   means for determining whether a security reputation for the first object meets a security threshold;
   means for determining a security risk of the polymorphic file that created the first object based on the security reputation of the first object, wherein, responsive to a determination that the security reputation for the first object meets the predetermined security threshold, the polymorphic file is determined to comprise malware if it meets a security threshold determined based on at least one of: the number of distinct first objects created by the polymorphic file and the number of times a distinct first object is created by the polymorphic file;
   means for storing the security reputation for the first object in a database;
   means for linking a second mutation of the polymorphic file to the first mutation by subsequently identifying the first object created by a second mutation of the polymorphic file at a second time; and
   means for receiving the security risk of the polymorphic file that created the first object at the first and second times based on the determined security reputation of the first object.

20. The computer system of claim 19 further comprising:
   means for, responsive to determining that a polymorphic file comprises malware, blocking an attempt by the polymorphic file to perform an activity associated with an associated object.

\* \* \* \* \*